3,100,785
DIALKYL TIN CHLORIDE DIALKYLPHOSPHITE
Joseph E. Dunbar, Midland, Mich., assignor to The Dow Chemical Company, Midland, Mich., a corporation of Delaware
No Drawing. Filed Oct. 29, 1962, Ser. No. 233,903
8 Claims. (Cl. 260—429.7)

This invention is directed to the phosphite compounds corresponding to the formula:

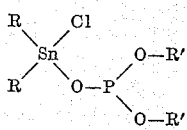

In this and succeeding formulae, R and R' each represent lower alkyl. In the present specification and claims, the expression "lower alkyl" is employed to refer to alkyl radicals containing from 1 to 4 carbon atoms, inclusive. These compounds are crystalline solid materials which are somewhat soluble in a number of common organic solvents and of very low solubility in water. The compounds are useful as parasiticides for the control of a number of mite, insect, helminth, fungal and bacterial organisms such as roundworms, beetles, aphids, flies and cotton leaf perforators.

The new compounds of the present invention can be prepared by reacting a tri(lower alkyl) phosphite with a di(lower alkyl) tin dichloride corresponding to the formula:

Representative starting materials include trimethyl phosphite, triethyl phosphite, tripropyl phosphite, tributyl phosphite, dimethyl tin dichloride, diethyl tin dichloride, diisopropyl tin dichloride and dibutyl tin dichloride. Good results are obtained when about one molecular proportion of the tin dichloride is employed with about one molecular proportion of the tri(lower alkyl) phosphite. The reaction takes place smoothly at temperatures at which alkyl chloride of reaction is produced. Conveniently, the reaction is carried out at temperatures of from 90° to 200° C. In carrying out the reaction, the tin dichloride and tri-(lower alkyl) phosphite are mixed and contacted together in any convenient fashion and maintained for a period of time at temperatures at which alkyl chloride is produced. In a preferred method, the reaction is carried out at a temperature of from about 120° to 200° C. Following the reaction, the desired product can be separated and purified by conventional procedures such as filtration and crystallization from common organic solvents.

In a representative operation, 33 grams (0.15 mole) of dimethyl tin dichloride and 18.6 grams (0.15 mole) of trimethyl phosphite are mixed together and heated at from 125° to 150° C. for two hours. The heating is accompanied by the evolution of gaseous methyl chloride. Toward the end of the heating period, no further substantial amounts of methyl chloride of reaction are evolved. Following the reaction, the reaction mixture is cooled to obtain the dimethyl tin chloride dimethyl phosphite product as a crystalline solid residue. This product is successively recrystallized from nitromethane and found to melt at 120.5°–122° C. and to have carbon, hydrogen and chlorine contents of 16.55 percent, 4.14 percent and 11.81 percent, respectively, as compared to theoretical contents of 16.38 percent, 4.13 percent and 12.09 percent.

In a further operation, 49.4 grams (0.2 mole) of diethyl tin dichloride and 50 grams (0.2 mole) of tri(secondary butyl) phosphite are mixed together and heated at a temperature of from 160° to 200° C. for two hours. The heating is accompanied by the production of secondary butyl chloride of reaction and the substantial cessation of the production of this reaction product toward the end of the heating period. Following the reaction, the reaction mixture is cooled to obtain the diethyl tin chloride di-(secondary butyl) phosphite product as a crystalline residue having a molecular weight of 405 and a chlorine content of 8.8 percent.

In similar and comparable operations, other products of the present invention are prepared in the following manner.

Diisopropyl tin chloride diethyl phosphite (molecular weight of 377) by reacting together diisopropyl tin dichloride and triethyl phosphite.

Diethyl tin chloride dimethyl phosphite (molecular weight of 321) by reacting together diethyl tin dichloride and trimethyl phosphite.

Dibutyl tin chloride dimethyl phosphite (molecular weight of 377) by reacting together dibutyl tin dichloride and trimethyl phosphite.

Dimethyl tin chloride dipropyl phosphite (molecular weight of 349) by reacting together dimethyl tin dichloride and tripropyl phosphite.

Dimethyl tin chloride diethyl phosphite (molecular weight of 321) by reacting together dimethyl tin dichloride and trimethyl phosphite.

The novel compounds of the present invention are useful as parasiticides for the control of a number of pests. For such use, the products can be dispersed on inert finely divided solids and employed as dusts. Such mixtures also can be dispersed in water with or without the aid of surface active agents and employed as sprays. In other procedures, the products can be employed as active constituents in aqueous or solvent mixtures, in oil-in-water or water-in-oil emulsions or in aqueous dispersions. In representative operations, aqueous compositions containing 500 parts per million by weight of dimethyl tin chloride dimethyl phosphite give substantially complete kills of southern army worms and cotton leaf perforators.

What is claimed is:
1. A compound having the formula

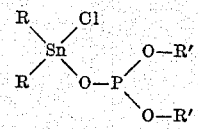

wherein R and R' each represent lower alkyl.
2. Dimethyl tin chloride dimethyl phosphite.
3. Diethyl tin chloride di(secondary butyl) phosphite.
4. Diethyl tin chloride dimethyl phosphite.
5. Diisopropyl tin chloride diethyl phosphite.
6. Dimethyl tin chloride diethyl phosphite.
7. Diethyl tin chloride diethyl phosphite.
8. Dibutyl tin chloride dimethyl phosphite.

No references cited.